United States Patent [19]
England

[11] 4,032,998
[45] July 5, 1977

[54] STAND UP TOILET

[76] Inventor: Robert W. England, Rte. 3, Box 356, Cheney, Wash. 99041

[22] Filed: Nov. 6, 1975

[21] Appl. No.: 629,385

[52] U.S. Cl. .................................. 4/111; 4/116; 4/134

[51] Int. Cl.[2] ................................. A47K 11/02

[58] Field of Search ............. 4/110, 111, 112, 113, 4/134, 138, 142; 248/151, 188, 188.8, 148

[56] References Cited

UNITED STATES PATENTS

| | | | |
|---|---|---|---|
| 1,667,913 | 5/1928 | Weston | 248/151 X |
| 2,204,343 | 6/1940 | Dawson | 4/134 |
| 3,134,299 | 5/1964 | Allen | 248/151 X |
| 3,327,324 | 6/1967 | Marsch | 4/111 |
| 3,795,923 | 3/1974 | Thomas | 4/134 |
| 3,854,773 | 12/1974 | Thomas | 4/134 X |

Primary Examiner—Henry K. Artis
Attorney, Agent, or Firm—Wells, St. John & Roberts

[57] ABSTRACT

A stand up toilet for handicapped persons who are unable to bend at the waist and incapable of sitting on a conventional form of toilet. The stand up toilet includes four upright legs that are connected together by a horizontal rectangular support plate. The legs and plate are releasably connected so that the device may be easily assembled and disassembled. The support is located below upper ends of the legs. An upwardly open container is loosely received between the upward projections of the legs and rests loosely against the support. The container includes an elongated upwardly facing opening and provides an upward and outwardly projecting deflector flange along a rear side thereof. The container is loosely held by the legs and support so it may be easily removed and replaced. An adjustment feature enables upward and downward adjustment of the container by elevationally changing the support level.

5 Claims, 3 Drawing Figures

STAND UP TOILET

BACKGROUND OF THE INVENTION

The present invention relates to toilets and more particularly to such toilets utilized by handicapped persons who are unable to bend at the hips or otherwise be seated at a conventional form of toilet seat.

The ordinarily simple toilet tasks of defecation and urination become a constant problem and source of humiliation and embarrassment to people who are handicapped by back injuries or other afflictions that prohibit them from bending at the hips or otherwise sitting as is expected of most people. This condition makes it nearly impossible for that person to attend to himself when utilizing a conventional sit down type toilet. It has therefore become very desirable for such persons to obtain a form of toilet that may be utilized from a standing or a near standing position.

U.S. Pat. No. 3,327,324 discloses a stand up toilet that provides a serviceable solution to this problem. In this patent, a receiving container is provided on a single post telescoping stand. The container includes another two separate inner containers for use as toilet facilities. These containers are removable from the receiving container. The receiving container is fixed to the central post.

The post arrangement is designed so that the container and the removable containers held therein may be elevated at will by the user. The mechanism utilized for this purpose is a toggle lever type linkage that may be selectively locked in position by a set screw or slip pin. Although this device is serviceable, it is relatively complex by nature and presents an accumulation of many elements that must be assembled and disassembled should the user need to move the apparatus from place to place. The number of elements that are required to be assembled and disassembled discourage its use as a portable unit.

Another U.S. Pat. No. 1,659,725 discloses a bidet. This apparatus uses a foldable framework that includes at a top surface, ovato-oblong seat that is hinged to "sawhorse"-like leg members. A rectangular open container is removably carried below the seat and a pivoted bracket is provided for a length of flexible tube which may be connected to the faucet of a sink or bathtub. The container further includes a drain. Obviously, it is not the intent that this apparatus be used as a toilet facility nor is there any teaching towards its utilization as, in particular, a stand up form of toilet as that taught by U.S. Pat. No. 3,327,324.

Various other forms of portable toilet apparatus are known but are not considered to be pertinent to the present improved apparatus. For example, several forms of fold up arrangements have been devised for use with automobiles and incorporated therein integrally with the floor section. These apparatus assume that the user may bend readily at the hips. If not, he would not be able to sit in the automobile in the first place.

The present invention is intended to provide an extremely simple apparatus that is equally simple for a person of either sex to utilize in a manner in which no attendant is required. The device is constructed very simply and of relatively few interconnecting elements to enable ease in assembly and disassembly. It includes a single container that is easily removable from its support for emptying and cleaning.

SUMMARY OF THE INVENTION

A stand up toilet is herein described that comprises a plurality of upright legs releasably joined to a horizontal support. The support interconnects the legs at a location downward of upward leg ends so that portions of the legs project upwardly from the support. A container is provided that includes an open upper end and a closed lower end that is adapted to be loosely received between the portions of the legs extending above the support and with the closed lower end loosely resting against the support.

It is a first object of my invention to provide a stand up toilet that will enable handicapped persons to utilize a toilet facility without requiring assistance from another person and without bending his body from the hips upward.

Another object is to provide such a toilet that is very easily assembled and disassembled to facilitate its transport and storage.

A still further object is to provide such a stand up toilet that is simple in construction, easy to manufacture and therefore inexpensive to purchase.

An additional object is to provide such a stand up toilet that includes adjustment features that enable its adaptation to persons of different height.

These and still further objects and advantages will become apparent upon reading the following description which, taken with the accompanying drawings, disclose a preferred form of my invention. It is to be noted however that the drawings and following descriptions are exemplary only of a preferred form of my invention and that various modifications may be envisioned without departure of the scope thereof. Therefore, the appended claims are to be taken solely as definitions and restrictions upon the scope of the present invention.

DETAILED DESCRIPTION OF A PREFERRED EMBODIMENT

Figure 2:
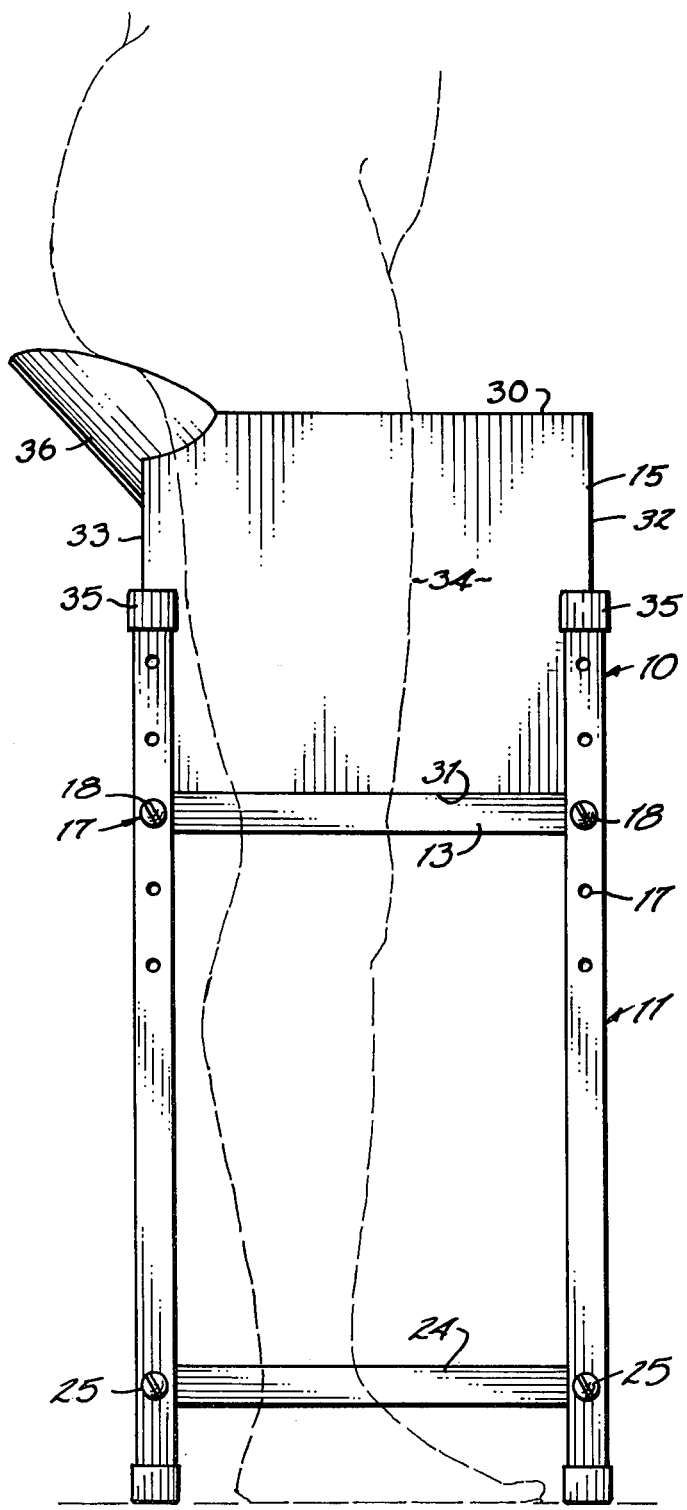
FIG. 2 is an elevational side view of the present toilet structure showing a user in dotted lines thereon.
Figure 3:
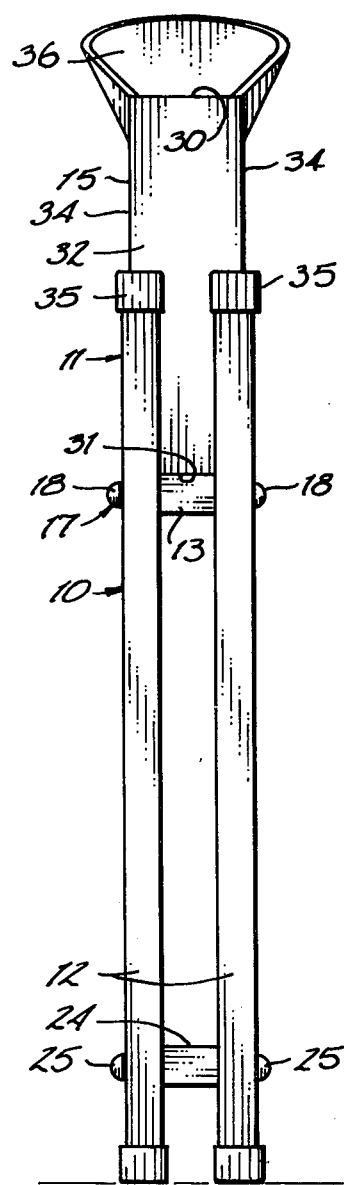
FIG. 3 is a front elevational view of the toilet structure.

Referring now in greater detail to the drawings, there is shown in FIGS. 2 and 3, assembled views of the present toilet structure as generally indicated by the reference numeral 10. This toilet structure is composed of two basic portions, a framework 11 and a container 15. Framework 11 is comprised of a plurality of upright legs 12 that are joined together by a horizontal rectangular support 13.

Figure 1:
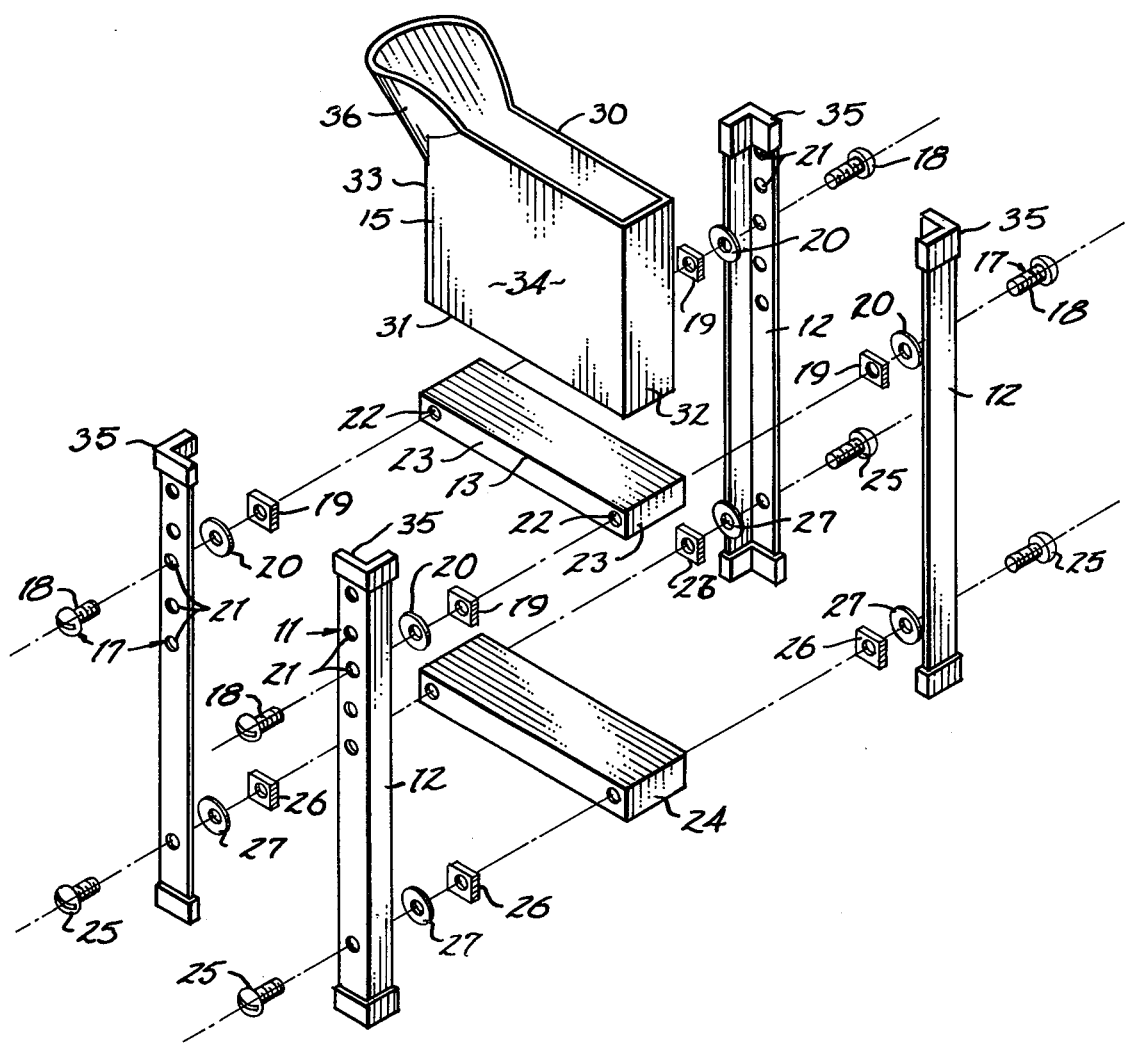
FIG. 1 is an exploded isometric view of the present invention.

Legs 12 are formed of angle iron with the right angle bends forming corners of a rectangular cross-section complementary to the configuration of container 15. Support 13 is mounted to legs 12 by an adjusting means 17. Means 17 is comprised of four screws 18, nuts 19, and washers 20 (FIG. 1). The screws 18 are selectively received through any one of a number of vertically spaced holes 21 formed through the legs 12.

Support 13 is also provided with holes 22 which may be aligned with appropriate holes 21 in legs 12 to selectively adjust the height of support surface 13. When a desired height is reached, the screws 18 are engaged through the aligned holes 21 and 22 and the nuts 19 and washers 20 are placed in threaded engagement with the screws on the inside surface of the support.

Support 13 is formed of a flat sheet of metal and includes downwardly bent side and end portions 23. These portions include holes 22. The support, when mounted to legs 12, provides a horizontal surface to receive the bottom portion of container 15. Elevational positioning of support 13 results in corresponding elevational positioning of the container 15 to accomodate users of different height.

Portions of legs 12 extending above the support 13 serve to brace the container 15 while it rests on support 13. Resilient pads 35 are provided on opposite ends of legs 12 to eliminate sharp edges and to engage the complementary corners of container 15 at the upper leg ends to prevent it from tipping off the surface of support 13.

A lower brace member 24 is provided on the framework 11 and is secured thereto by screws 25, nuts 26 and washers 27. Brace 24 secures the lower ends of legs 12 together to provide a rigid framework. It may be noted that all the parts described above may be easily assembled and disassembled with the use of a screwdriver and pliers. Assembly is relatively simple and may be completed in a short period of time. Also, the elements that the framework will break down into are relatively small and therefore present no considerable storage or transport problem.

The container 15 is formed of a synthetic resin material, preferably polyurethane. It includes an upwardly facing elongated open end 30 and an opposed closed bottom surface 31. Upright front, back and side walls 32, 33 and 34 extend between the open and closed bottom 31. The configuration as shown in the drawings is rectangular in cross-section. This configuration is complementary to that shape defined by legs 12 and support 13. However, the size of container 15 across support 13 is slightly less than the outside dimensions of support 13. Therefore, container 15 will loosely fit between the legs 12 with bottom 31 resting against the support 13.

The open end of container 15 extends across its entire length. A deflector lip 36 is provided at a back side 33 of the container. The lip 36 projects upwardly and rearward of the container. The lip defines a funnel configuration to receive and direct waste material downwardly into the confines of the container 15. It also functions to receive and partially support the user's buttocks as evidenced in FIG. 2.

In use, toilet 10 is first assembled with the support 13 located at a desired position along the length of legs 12 so the open container end 30 is elevationally located at a height required by the user. The container is then positioned in place on support 13.

The dashed outline of a user is illustrated in FIG. 2 to designate one "universal" method for using the present toilet. When in use as such, the toilet is situated between the user's legs with the front side 32 projecting forwardly or in front of the user and the deflector lip 36 projecting rearwardly. The height should be such that the user's buttocks will rest on the outwardly flaired edges of lip 36.

The loose reception of container 15 between legs 12 and support 13 facilitates its removal therefrom for emptying and cleaning purposes. Further, This assists in quick and efficient disassembly of the complete unit when it is desired to be stored or transported in a more compact condition.

Again, it is noted that it may have become obvious from the above description that various changes and modifications may be made therein without departing from the intended scope of my invention. Therefore, only the following claims are to be taken as restrictions upon the scope of my invention.

What I claim is:
1. A stand up toilet, comprising:
   a plurality of upright legs;
   a horizontal support releasably interconnecting the legs and located downward of upper leg ends so that portions of the legs project upwardly from the support;
   a container of rectangular cross section having an open upper end and a closed lower end adapted to be loosely received between portions of the legs extending above the support with the closed lower end loosely resting against the support; and
   wherein an upward and rearwardly projecting deflector is provided at the open upper end of the container at a rearward end of the opening.
2. The toilet as defined by claim 1 further including means for adjusting the height of the support relative to the ends of the legs.
3. The toilet as defined by claim 1 wherein the container is generally rectangular in cross-section and wherein the legs are formed of angle iron and are located at forward and rearward corners of the container to hold it in place on the support.
4. The toilet as defined by claim 2 wherein the means for adjusting the height of the support is comprised of a screw and nut combination for each leg and a plurality of holes spaced along the legs, with complementary screw shank receiving holes in the support.
5. The toilet as defined by claim 4 wherein the container is generally rectangular in cross-section and wherein the legs are formed of angle iron and are located at forward and rearward corners of the container to hold it in place on the support.

* * * * *